United States Patent [19]

Yoshizumi

[11] Patent Number: 4,822,139
[45] Date of Patent: Apr. 18, 1989

[54] OPTICAL HEAD APPARATUS FOR OPTICAL DISC PLAYER

[75] Inventor: Keiichi Yoshizumi, Osaka, Japan

[73] Assignee: Matsushita Electric Industrial Co., Ltd., Osaka, Japan

[21] Appl. No.: 815,703
[22] PCT Filed: May 10, 1985
[86] PCT No.: PCT/JP85/00264
 § 371 Date: Dec. 9, 1985
 § 102(e) Date: Dec. 9, 1985
[87] PCT Pub. No.: WO85/05487
 PCT Pub. Date: Dec. 5, 1985

[30] Foreign Application Priority Data

May 15, 1984 [JP] Japan ................................. 59/96880

[51] Int. Cl.4 ............................ G02B 7/02; G11B 7/00
[52] U.S. Cl. ..................................... 350/257; 350/255; 369/45
[58] Field of Search ................. 350/247, 257, 6.3, 401, 350/255; 369/44, 45

[56] References Cited

U.S. PATENT DOCUMENTS

| 4,322,838 | 3/1982 | Neumann ............................ 350/255 |
| 4,472,024 | 9/1984 | Konomura et al. ................. 350/255 |
| 4,554,653 | 11/1985 | Malissin et al. ..................... 350/247 |
| 4,564,931 | 1/1986 | O'Hara et al. ....................... 350/401 |
| 4,568,142 | 2/1986 | Iguma ................................... 350/6.3 |
| 4,570,249 | 2/1986 | Malissin et al. . |
| 4,596,444 | 6/1986 | Ushida ................................ 350/247 |

FOREIGN PATENT DOCUMENTS

| 0070070 | 1/1983 | European Pat. Off. . |
| 3202269 | 8/1982 | Fed. Rep. of Germany . |
| 58-98848 | 6/1983 | Japan . |
| 58-161152 | 9/1983 | Japan . |

Primary Examiner—John K. Corbin
Assistant Examiner—Loha Ben
Attorney, Agent, or Firm—Wenderoth, Lind & Ponack

[57] ABSTRACT

An optical head apparatus for an optical disc player which stabilizes the servo action, enables high speed access, extends the drawing range of tracking servo action, and further enhances the servo stability. This is done by making the driving mechanism and movable parts for access common to those for tracking to reduce the weight, and moving the stand carrying the condenser lens and mirror in focusing, tracking and accessing in the direction of the optical axis to eliminate deviation of the optical path, and also fixing the tracking and access coils to the condenser lens.

3 Claims, 3 Drawing Sheets

OPTICAL HEAD APPARATUS FOR OPTICAL DISC PLAYER

FIELD OF THE INVENTION

This invention relates to an optical head capable of picking up or erasing recorded information by converging a laser beam on a rotating disc type recording medium by means of a condenser lens to record the information, and accessing an arbitrary position on the disc for recording or reproducing, that is, accessing randomly at high speed.

BACKGROUND OF THE INVENTION

In the field of optical disc player, recently an optical head capable of accessing randomly an arbitrary position on a disc at high speed is attracting a wide attention.

The conditions of high speed access may be summarized below.

That is, there are two requirements for high speed access of the optical head. The first is that the speed of moving the optical head in the radial direction of the disc should be high, and the second is that the tracking servo should be stable.

To access at high speed, generally two processes—that is, rough access and fine access—are combined.

The rough access is a process of moving the optical head approximately to the radical position at a desired address position on the disc. The approximate radial position is known, for example, by attaching a linear potentiometer to the optical head and reading its voltage. Supposing the distance between the radial position before moving and that of the desired address track to be x, the fastest rough access is achieved by the optical head up to x/2 position at maximum acceleration and slowing down from x/2 to x position at maximum deceleration. It is ideal if the desired track is reached by the rough access alone, and in a magnetic disc or the like, the access is completed by this rough access alone. However, in the magnetic disc, the track width is about tens of $\mu$m to hundreds of $\mu$m, while the track width of an optical disc is as narrow as 1.6 $\mu$m, and it is extremely difficult to reach the desired address track by the rough access alone. Accordingly, by reading the address of the track reached by rouch access, the light spot is caused to jump from this address track to the desired address track by a jumping pulse. This is called fine access.

Therefore, to access in the shortest time, it is necessary to quicken the moving speed of the optical head and bring it as closely to the desired track as possible in the rough access. In the fine access, it is required to jump over may tracks accurately in a short time, and for this purpose, the wide drawing range of the tracking servo and high servo gain are indispensable.

Various optical heads have been known conventionally, but, for example, to access within 0.1 second, sufficient characteristics are not obtained by either rough access or fine access. The main reason is that the moving part is heavy. Conventionally, the usual practice is to move the entire optical head by means of a linear motor, but since the optical head comprises a laser, a focusing actuator and its magnetic circuit, tracking actuator and its magnetic circuit, mirrors and a polarizing prism, lenses, a photo detector, a preamplifier, and other parts, its weight is at least several hundred grams. The rough access time T is expressed, assuming the moving part weight to be m, drive force to be F and moving distance to be x, as follows.

$$T = 2\sqrt{mx/F}$$

This equation is derived in the following sequence. Assuming acceleration for a moving distance of x/2 and decelerate from x/2 to x, the equation of motion $$F = m(d^2x)/(dt^2)$$

is integrated. In the prior art, supposing F=3N, m=400 g, and x=40 mm, for example, the rough access time is T=0.15 sec. Therefore, in the prior art, it takes as long as 0.15 sec for the rough access alone.

In the fine access, conventionally, the drawing range of tracking was too narrow. In a disc for recording and reproducing, the method of picking up an error signal of the tracking servo from the far-field pattern of diffracted light from the guide groove for tracking is called the far-field method, and in the conventional tracking method of swinging the objective lens in the radial direction of the disc or using a tracking mirror, the drawing range of the tracking servo is narrow.

For instance, in the method of swinging the lens for tracking purposes, as shown in FIG. 1(a), the reflected light from disc 3 moves along with the movement of the lens 2 which is driven by X-Y drive 1, and the movement of the reflected light is superposed as an offset on the error signal of the tracking of a fixed two-division photo detector 4, thereby narrowing the drawing range of tracking. This point may be improved, for example, by the arrangement as shown in FIG. 1(b). That is, when the photo detector 5 for detection of the tracking signal by the far-field method is integrally constructed with the lens 2, the drawing range is expanded about 2.5 times as compared with that of the method of swinging the lens 2 alone. (For example, this is described in detail in the Preprint of Lectures at the Applied Physics Congress, fall 1981, p. 121.) Even in this method, however, a drawing range wider than luminous flux diameter entering the lens 2 cannot be obtained, or a photo detector, a $\lambda/4$ plate and a polarizing prism must be assembled, together with the lens, into the actuator, which results in a heavy weight, a complicated structure, and difficulty in manufacture.

Another method has been proposed, as shown in FIG. 1(c), in which 2 is swung only the lens for focusing, a mirror 8 is fixed to a stand 7 which supports this lens 2 by means of a leaf spring 6, and this stand 7 is swung for tracking. This method is, for example, described in the Journal of Society of Electronic Communications (1983, No. 8, p. 838). In this method, however, although the stand 7 is swung by fixing the coil for tracking, since the light spot which is to be moved actually corresponds to the movement of the lens 2, it is as if the light spot is swung through the leaf spring 6 which supports the lens 2. Therefore, by the action of the leaf spring 6, secondary resonance appears in the tracking curve, so that the gain of the servo cannot be raised sufficiently. Or, since the circular gap in the magnetic circuit for focusing is directed upward and the gap in other magnetic circuit for tracking is directed sideways, the drawing range of tracking is limited to be within the gap in the magnetic circuit for focusing, and only a range of 1 to 2 mmm can be obtained. In this method, too, the entire optical head must be moved in for rough access.

Thus, in the conventional methods, the entire optical head must be moved in rough access for shortening the access time, and the heavy weight of this head has been a bottleneck for high speed access, while in the fine access there have also been serious problems, such as a narrow drawing range of tracking, heavy weight of moving parts, and insufficient gain of the tracking servo for achieving high speed access.

DISCLOSURE OF THE INVENTION

It is hence a primary object of this invention to provide an optical head for an optical disc player for reproducing and recording on optical discs or being capable of recording, reproducing and erasing, by solving the above-discussed difficulties in the prior art and providing characteristics to permit high speed access, that is, by extremely reducing the weight of the moving parts in the disc radial direction to achieve high moving speed, stabilizing the tracking servo by the optical system in which the drawing range of the tracking servo is substantially infinite and the mechanical system which permits rising the tracking servo gain sufficiently high, and also raising, the speed during fine access, and also being capable of reducing the manufacturing cost by facilitating the manufacture and reducing the number of constituent parts.

In order to achieve the above object, this invention provides an optical head suited to high speed access which is a mechanism possessing optical stability and favorable servo characteristics, and which comprises a stand movable in the radial direction of the disc type recording media, a light reflecting means fixed on said stand for reflecting approximately parallel beams of light having the optical axial direction in said radial direction in a direction approximately vertical to said disc type recording media surface, a condenser lens for converging the reflected light from said light reflecting means to said disc type recording media surface, a flexible support member with one end fixed to said condenser lens and the other end to said stand for supporting the condenser lens in a direction approximately vertical to the recording plane of the disc type recording media, a coil integrally fixed to the condenser lens and wound so as to apply a driving force in a direction approximately vertical to the disc type recording media and in said radial direction, and a magnetic circuit possessing a gap in which said coil is inserted.

DESCRIPTION OF THE PREFERRED EMBODIMENTS

Figure 2A:
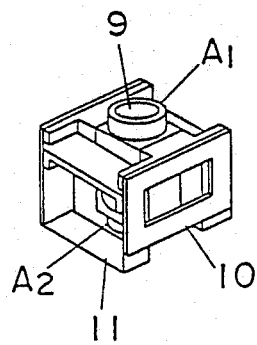
FIGS. 2(a), 2(b) and 2(c) are perspective views of the mechanical part of the optical head for an optical disc player according to one of the embodiments of this invention.
Figure 2B:
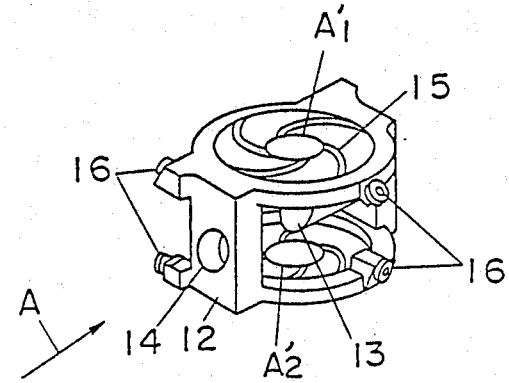
Figure 2C:
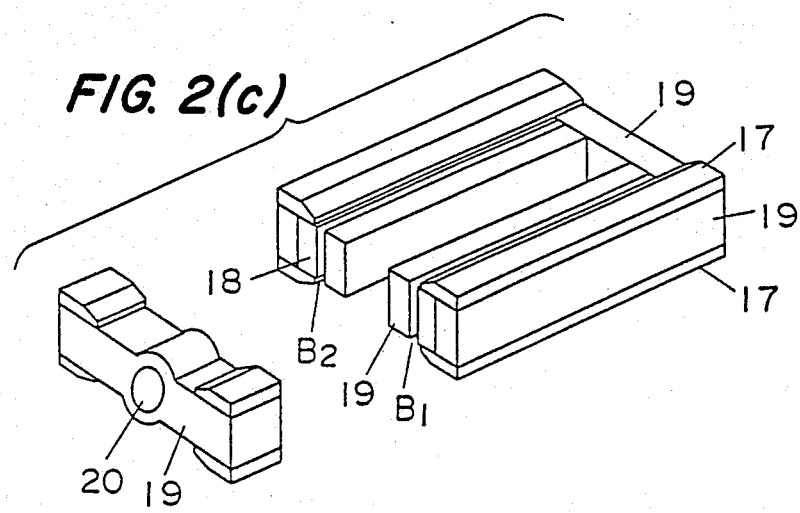
Figure 3:
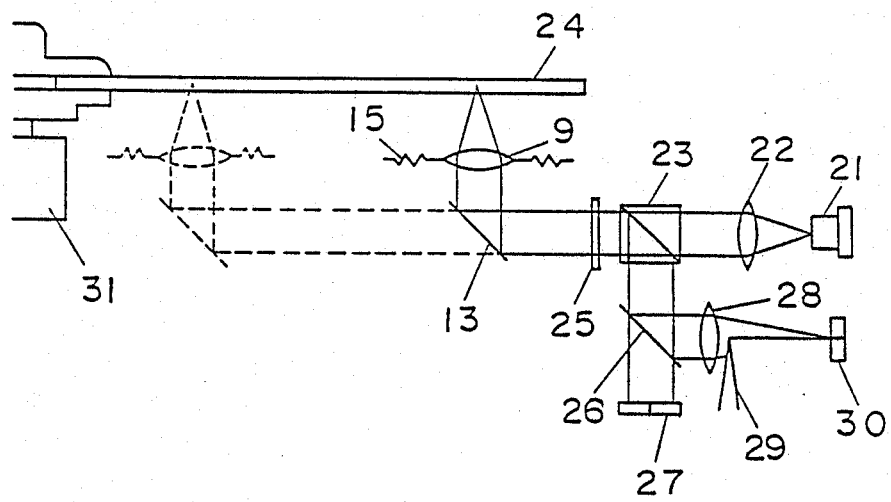
FIG. 3 is a general diagram of the same optical head.

Embodiments of this invention are explained below with reference to the accompanying drawings. The parts of FIG. 2 are perspective views of the mechanical parts of an optical head according to one of the embodiments of this invention, FIG. 2(a) showing its lens barrel, FIG. 2(b) its stand, and FIG. 2(c) the composition of its magnetic circuit. FIG. 3 is a general structural drawing of the optical head of this embodiment.

In the parts of FIG. 2, numeral 9 designates a condenser lens for converging the laser beam on a disc, to which are integrally affixed a driving coil 10 for focus servo (hereinafter called focus coil 10) and a coil 11 for a tracking servo and driving to feed the disc in a radial direction (tracking coil 11). Numeral 12 designates a stand, and a mirror 13 having a reflection plane inclined 45° to the incident light in the middle part is secured to the stand 12. Approximately parallel laser beams entering from the direction of arrow A paass through a circular opening 14 in the stand 12, and are reflected upward by the mirror 13, and enter the condenser lens 9. Numeral 15 designates flexible support members which are fixed to upper end $A_1$ of the lens barrel by fixing part $A'_1$, and to the lower end $A_2$ thereof by fixing parts $A'_2$. The flexible support members (hereinafter called leaf springs) 15 are made of metallic leaf spring material, rubber, resin, etc., and are designed to support the lens barrel, including the condenser lens 9, so as to be movable in the vertical direction. The stand 12 shown in FIG. 2(b) moves on rails 17 by means of bearings 16.

The magnetic circuit shown in FIG. 2(c) is composed of magnet 18 and yoke 19, and focus coil 10 and tracking coil 11 are inserted into gaps $B_1$, $B_2$. The bearings 16 roll on the slope of the rail 17, and the stand slides. An opening 20 is intended to pass the approximately parallel incident light to the disc and the exit light from the disc.

FIG. 3 is a general structural drawing of the optical head of this embodiment, in which numeral 21 is a semiconductor laser. The light leaving the semiconductor laser 21 is formed into approximately parallel beams of light by a collimating lens 22, passes through polarizing prism 23 and λ/4 plate 25, and is reflected by the mirror 13 which is fitted to the stand and which moves along rails 17 in the same direction as these approximately parallel light beams, that is, in the radial direction of the disc 24, and is converged on the recording plane of the disc 24 by means of the condenser lens 9. The reflected light from the disc 24 passes again through the condenser lens 9, is reflected by mirror 13 and passes through λ/4 plate 25, and is turned into S polarized wave by the polarizing prism 23 and is reflected, and is divided into two parts by half mirror 26, and one part enters a two-division photo detector 27 while the other part is converged by the lens 28 and is partly shielded by a shielding plate 29 and is converged on another two-division photo detector 30. On the photo detector 27, a tracking error signal is detected from the diffracted light of the track on the disc, and the focus error signal is detected by photo detector 30. From the outputs of both photo detector 27 and two-division photo detector 30, the information signal on the disc 24 is picked up. The focus error signal and tracking error signal are amplified and compensated for phase by the servo circuit, and an electric current is applied into the focus coil 10 and tracking coil 11, and servo action is applied. Numeral 31 denotes a disc drive motor.

Concerning the operation of the optical head of this embodiment, the optical system will be briefly explained, and the mechanical system will be described in detail.

As for the optical system, in FIG. 3, when accessing, only the mirror 13 and condenser lens 9 move, and only the condenser lens 9 moves in focus servo movement, so that the movements of these movable parts are all in the direction of the optical axis of the approximately parallel laser beams. Therefore, this optical system is completely free of troubles, such as shift of the reflected light distribution from the disc due to movement of these optical parts, and, in this sense, the optical drawing range of tracking is infinite.

Concerning the mechanical system, a first feature is that the focus coil, tracking coil and access coil are integrally affixed to the condenser lens 9. The magnetic circuit in FIG. 2(c) is common to focus and tracking, and there is a magnetic flux in a direction vertical to the magnetic gap. Since only the lower part of the focus coil 10 is inserted into the gap, the electromagnetic force acts vertically. In the tracking coil, since the electric current flows in the vertical direction in the gap, the electromotive force acts along the rails 17, i.e. in the radial direction of the disc.

Figure 4A:
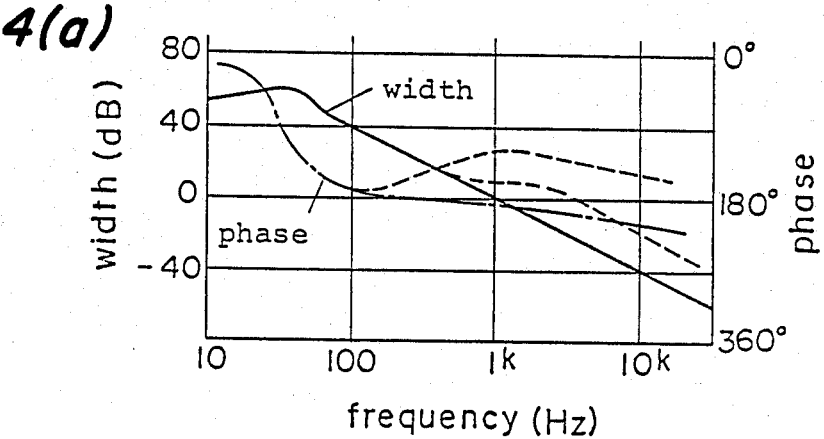
FIGS. 4(a) and 4(b) are characteristic diagrams of the same optical head.

In the focus direction, only the condenser lens 9 moves vertically on the leaf spring 15. The leaf spring 15 is possesses damping characteristics, and it has a resonance point, in the vertical direction, at a low frequency $f_1$, that is, about 30 to 60 Hz, so that in the focus direction the actuator has the same characteristics as the conventional actuator. The characteristic of this focus actuator is shown in FIG. 4(a), in which the solid line in the amplitude, and the dot-dash line refers to the phase, and the broken line is the characteristic after phase compensation by the servo circuit which comprises a high pass filter with a range of 500 Hz to 5 kHz. The phase compensation is applied because the system oscillates when the phase of the response of actuator deviates more than 180° from the error signal so that servo gain may not be obtained. Thus, the characteristics of the focus actuator are exactly the same as in the prior art.

Figure 4B:
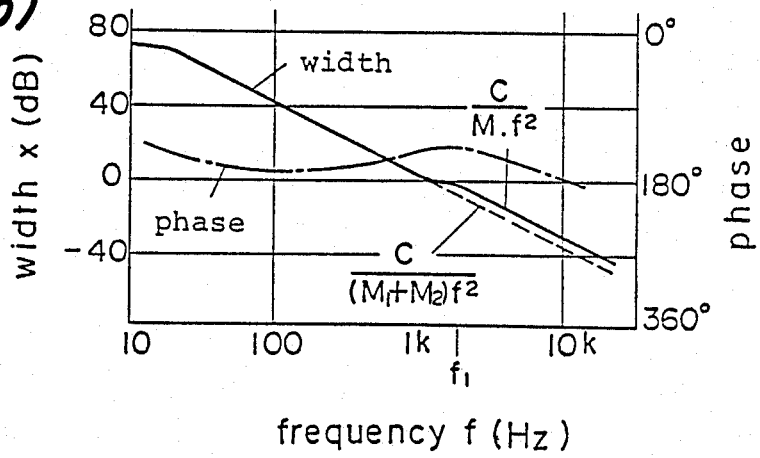

On the other hand, the tracking and access operations are different from the conventional performances. That is, the condenser lens 9 is directly driven by the tracking coil 11, and the driving force is applied to the stand through leaf spring 15. The leaf spring 15 possesses a relatively high resonant frequency $f_2$ of 1 kHz to 2 kHz, in addition to the damping characteristics, with respect to the tracking and access direction. When the input signal frequency to the tracking coil 11 for tracking and access is sufficiently lower than $f_2$, the condenser lens 9 and stand move in unity, but when the input frequency is sufficiently larger than $f_2$, the stand does not move, and only the lens barrel including the condenser lens 9 moves. Supposing the mass of the movable part to be M and input frequency to be f, the amplitude W of movable part is $$W = C/Mf^2$$

where C is a constant proportional to the amplitude of the input voltage. It becomes a straight line in FIG. 4. Incidentally, the mass of movable part movable in the tracking direction is the sum of the mass $M_1$ of the lens barrel and the mass $M_2$ of the stand at a low frequency as mentioned above, but it is only the mass $M_1$ of the lens barrel when the frequency is high, so that the amplitude W is, when the frequency is lower than $f_1$ as in FIG. 4(b), $$C/(M_1+M_2)f^2$$

and when higher than $f_1$, $$C/M_1 f^2.$$

Figure 1A:
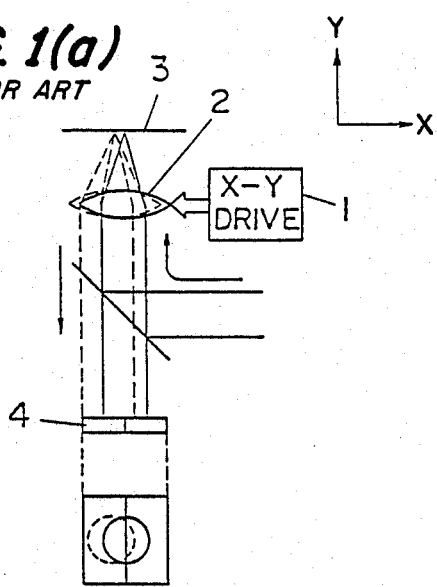
FIGS. 1(a), 1(b) and 1(c) are diagrams to illustrate the composition of the conventional optical heads for an optical disc player.
Figure 1B:
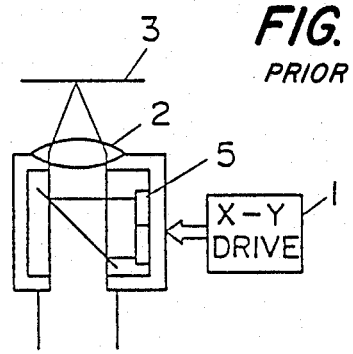
Figure 1C:
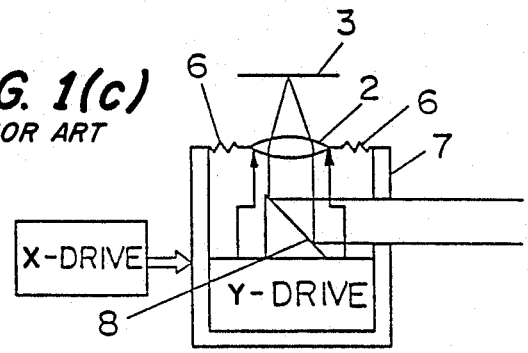

Therefore, the characteristics of the actuator in the tracking and access direction are same as those after phase compensation in the circuit, with the phase being lifted at $f_1$. As described in connection with FIG. 1(c) in the prior art, conventionally, so to speak, the tracking coil is fixed to the stand, and the secondary resonance was delayed in phase and the servo gain can not be raised. In this embodiment, by contrast, the secondary resonance rather works in a direction to raise the servo gain, and further favorable actuator characteristics are obtained by applying phase compensation by the servo circuit.

Since the mirror 13 is fixed to the stand, it does not respond to the input signal in the tracking direction at high frequency, but the difference in the dislocation in the tracking direction between mirror 13 and condenser lens is less than several μm, and there is no adverse effect on the optical system or servo system.

In this embodiment, $M_1$ is 4 g and $M_2$ is 5 g, and the maximum power obtained by the coil is 0.6N (Newton) in the focus direction and 1N in the tracking and access direction. Therefore, the maximum acceleration is, supposing the gravitational acceleration to be G, 15 G in the focus direction, and 25 G at high frequency and 11.3 G at low frequency in the tracking direction. Therefore, for a moving distance of 40 mm, the rough access time is notably shortened to 0.038 sec.

Thus, in this embodiment, the access time can be shortened by the increase of the moving speed in the radial direction of the disc due to reduction of the weight of the movable part, extension of the drawing range of tracking servo, and intensification of tracking servo gain. In this optical head, accordingly, as compared to three sets of a magnetic circuit, forcus coil, tracking coil and access coil have been required conventionally, only one magnetic circuit and two coils are needed, and the number of parts is reduced, and the cost is lowered, too.

Besides, in the conventional method of moving the entire optical head, there are about 20 wires leading from movable parts to fixed parts for feeding electric power to the laser, coils, photo detectors, head amplifiers, and other elements, and it has been difficult to arrange the wires without disturbing the movement of the movable parts. In this invention, by contrast only four wires are coming from the movable parts to the fixed parts, and the wire arrangement is quite easy.

Meanwhile, in this embodiment, the tracking and access coils are fixed only to the lens barrel, but the access coil may be fitted to the stand in order to increase the force of access.

Figure 5:
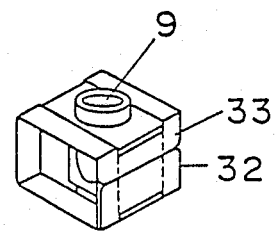
FIG. 5 is a perspective view of the essential parts of a different embodiment.

Concerning the position and winding method of the focus coil, several methods are possible. An example of winding is shown in FIG. 5, in which the trackig coil 32 is wound same as in FIG. 3, and numeral 33 designates the focus drive coil.

In the first embodiment, the tracking servo is controlled by the far-field method, but the three-beam method, wobbling method, and phase difference method may be equally applied. The same applies also to the pickup method of the focus error signal, and the astigmatism method, critical angle method, and phase difference method may be equally used. This may be used also in multi-beam recording, and in a two-beam optical system having a recording beam and an erasing beam for recording on erasable recording materials.

In the above embodiment, the stand slides on the rail by means of roller bearings, but, of course, other sliding bearings may be used.

POSSIBILITY OF INDUSTRIAL USE

In the present invention, the driving mechanism and movable parts for access are identical with those for tracking, the access speed can be notably increased by the reduction of weight of the movable parts, the moving direction of the movable parts of lens and mirror in the focus, tracking, and access are all in the direction of the optical axis so as to be free from deviation of the optical path due to servo action of focus or tracking, the optical system is always in an ideal state, the tracking and access coils are fixed to the condenser lens, and the stand on which a mirror is mounted is moved by means of a leaf spring. By this composition, the secondary resonance of the leaf spring, which has been one of the conventional problems, can be prevented, and the servo can be stabilized by giving the same effect as the phase compensation of the servo circuit. Moreover, the cost can be lowered because the number of coils and magnetic circuits is reduced, and there are many other effects in various aspects. More important, the instability of servo action due to narrowness of the drawing range of tracking servo, long access time, and high cost of the optical head, which were conventionally major problems for general use of an optical disc, can be solved all at once, and the industrial effect is enormous.

I claim:

1. An optical head apparatus for an optical disc player, comprising:
    a stand which is movable in the radial direction of a disc type recording media;
    a light source spaced from said stand for directing substantially parallel light beams in the direction of movement of said stand;
    a light reflecting means fixed to said stand for receiving said light beams and reflecting said light beams in a direction substantially perpendicular to the surface of the disc type recording media;
    a condenser lens for receiving and converging the reflected light from said light reflecting means onto the surface of the disc type recording media;
    a flexible support means having one end fixed to said condenser lens and the other end fixed to said stand for supporting said condenser lens for movement in said perpendicular direction;
    a first coil means integrally affixed to said condenser lens and wound for applying a driving force to said condenser lens to move it in said perpendicular direction;
    a second coil means integrally affixed to said condenser lens and wound for applying a driving force directly to said condenser lens to move it in said radial direction for both tracking and accessing; and
    a magnetic circuit having a gap extending in said radial direction and in which a part of each of said first and second coil means are positioned for driving said lens in said directions.

2. An optical head apparatus as claimed in claim 1 in which said flexible support means comprises a leaf spring.

3. An optical head apparatus as claimed in claim 1 further comprising a further coil means on said stand and wound in a direction for applying a driving force to said condenser lens in said radial direction and having a part thereof in said gap.

* * * * *